United States Patent
Kearl et al.

(10) Patent No.: US 7,981,560 B2
(45) Date of Patent: Jul. 19, 2011

(54) FUEL CELL WITH INTEGRAL MANIFOLD AND LATERALLY SPACED ELECTRODES

(75) Inventors: Daniel A Kearl, Philomath, OR (US); David Champion, Lebanon, OR (US); Gregory S Herman, Albany, OR (US); Richard B. Peterson, Corvallis, OR (US)

(73) Assignee: Eveready Battery Company, Inc., St. Louis, MO (US)

( * ) Notice: Subject to any disclaimer, the term of this patent is extended or adjusted under 35 U.S.C. 154(b) by 704 days.

(21) Appl. No.: 12/004,246

(22) Filed: Dec. 20, 2007

(65) Prior Publication Data
US 2010/0279207 A1    Nov. 4, 2010

Related U.S. Application Data

(62) Division of application No. 10/628,946, filed on Jul. 28, 2003, now Pat. No. 7,348,087.

(51) Int. Cl.
*H01M 8/24* (2006.01)
*B05D 5/12* (2006.01)

(52) U.S. Cl. ........ 429/456; 429/458; 429/513; 429/481; 427/115

(58) Field of Classification Search ............... 429/400, 429/479, 480, 481, 469, 456, 458, 512, 417, 429/513; 427/115
See application file for complete search history.

(56) References Cited

U.S. PATENT DOCUMENTS

| | | |
|---|---|---|
| 5,077,148 A | 12/1991 | Schora et al. |
| 5,445,903 A | 8/1995 | Cable et al. |
| 5,589,285 A | 12/1996 | Cable et al. |
| 6,312,846 B1 | 11/2001 | Marsh |
| 6,361,892 B1 | 3/2002 | Ruhl et al. |
| 6,387,559 B1 | 5/2002 | Koripella et al. |
| 6,497,975 B2 | 12/2002 | Bostaph et al. |
| 2002/0006539 A1 | 1/2002 | Kubota et al. |
| 2002/0012825 A1 | 1/2002 | Sasahara et al. |
| 2002/0020053 A1 | 2/2002 | Fonash et al. |
| 2002/0076598 A1 | 6/2002 | Bostaph et al. |
| 2002/0132156 A1 | 9/2002 | Ruhl et al. |
| 2002/0150804 A1 | 10/2002 | Srinivasan et al. |
| 2003/0003344 A1 | 1/2003 | Keegan |
| 2003/0031913 A1 | 2/2003 | Pavio et al. |
| 2003/0039874 A1* | 2/2003 | Jankowski et al. ............. 429/26 |

(Continued)

FOREIGN PATENT DOCUMENTS
EP    0810684 A2    12/1997

OTHER PUBLICATIONS

Bhusari, D. et al., J. Microelectromech. Systems, v. 10 (3) (Sep. 2001) pp. 400-408.

(Continued)

*Primary Examiner* — Raymond Alejandro
(74) *Attorney, Agent, or Firm* — Russell H. Toye, Jr.

(57) ABSTRACT

A MEMS-based fuel cell has a substrate, an electrolyte in contact with the substrate, a cathode in contact with the electrolyte, an anode spaced apart from the cathode and in contact with the electrolyte, and an integral manifold for supplying either a fuel or an oxidant or both together, the integral manifold extending over at least a portion of the electrolyte and over at least one of the anode and cathode. Methods for making and using arrays of the fuel cells are disclosed.

20 Claims, 6 Drawing Sheets

U.S. PATENT DOCUMENTS

2004/0115503 A1   6/2004   Jacobson et al.
2004/0180252 A1   9/2004   Wortman et al.

OTHER PUBLICATIONS

Craighead, H.G., Science, v. 290 (2000) pp. 1532-1535.
De Boer, M.J. et al., J. Microelectromechanical Systems, v. 9 (1) (Mar. 2000) pp. 94-103.
Kohl, P.A. et al., Electrochemical and Solid-State Letters, v. 1 (1) (1998) pp. 49-51.
Kohl, P.A. et al., IEEE Electron Dev. Letters, v. 21 (12) (Dec. 2000) pp. 557-559.
Mueller, M. et al., Microsystem Technologies, v.9 (2003) pp. 159-162.
Stern, M.B. et al., J. Vac. Sci. Technol. B., vol. 15 (6) (1997) pp. 2887-2891.
Turner, S.W. et al., Proc. SPIE, vol. 3258 (1998) pp. 114-121.

* cited by examiner

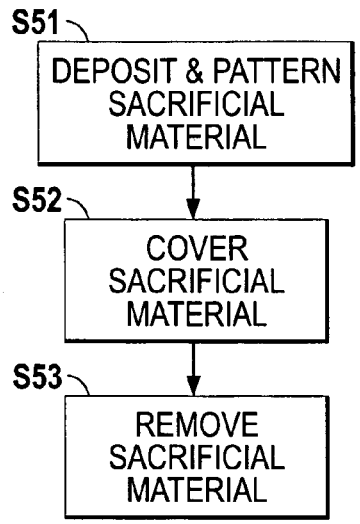
FIG. 5B
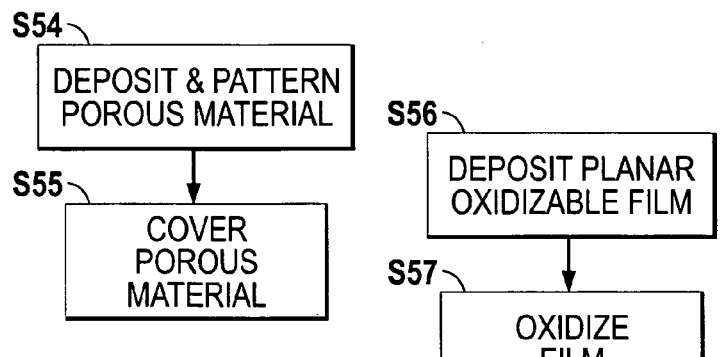
FIG. 5C
FIG. 5D
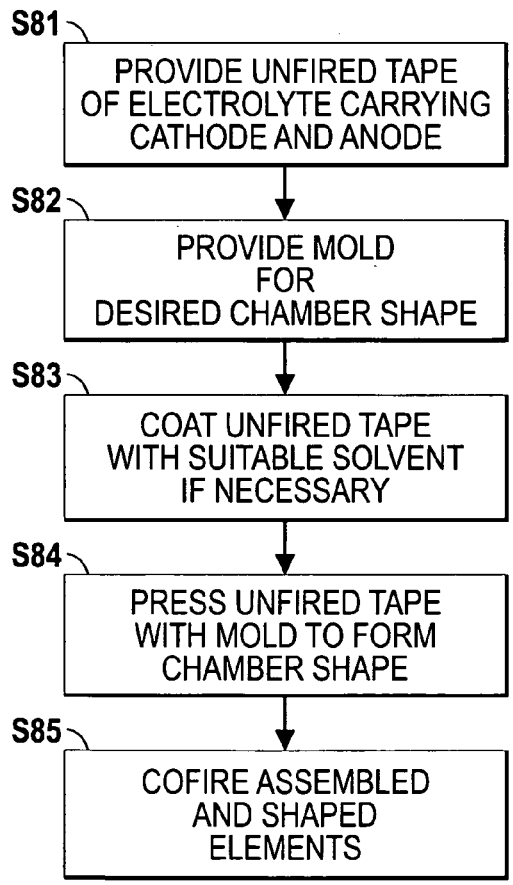
FIG. 5E ved for sensors and other purposes, the scale of such nanoscale manifolding is ill-suited for microscale fuel cell designs. There is a continuing need and a large anticipated market for improved practical compact portable fuel cells with rapid startup times and improved efficiency. There is a particular need for compact portable fuel cells with improved microscale manifolding of supplied fuel and/or supplied oxidant and with improved microscale manifolding for exhausting depleted oxidant and/or depleted fuel from the fuel-cell active region.

FUEL CELL WITH INTEGRAL MANIFOLD AND LATERALLY SPACED ELECTRODES

CROSS-REFERENCE TO RELATED APPLICATION

This patent document is a divisional and claims benefit of the earlier filing date of U.S. patent application Ser. No. 10/628,946, filed Jul. 28, 2003, which is now U.S. Pat. No. 7,348,087.

TECHNICAL FIELD

This invention relates to fuel cells and more particularly to a MEMS-based planar fuel cell having an integral manifold and to methods for making and using such fuel cells.

BACKGROUND

Various portable devices, such as laptop computers, personal digital assistants (PDA's), portable digital and video cameras, portable music players, portable electronic games, and cellular phones or other wireless devices, require portable power sources. The weight and inconveniences of single-use batteries and rechargeable batteries have motivated efforts to replace those power sources for portable use. Thus, there is an increasing demand for light-weight, re-usable, efficient, and reliable power sources in such applications and in many other applications as well. In attempts to meet these needs, various portable fuel cells have been developed, such as ceramic-based solid-oxide fuel cells, direct methanol fuel-cell (DMFC) systems, reformed-methanol-to-hydrogen fuel-cell (RMHFC) systems, and other proton-exchange-membrane (PEM) fuel-cell systems. Microscale design principles have been applied to the design of portable fuel cells to provide improved power density and efficiency and to provide lower cost. However, microscale fuel-cell designs can be difficult to supply with fuel and oxidant in ways that do not interfere with the purposes of the microscale design. Similarly, it can also be difficult to exhaust depleted fuel and oxidant in a microscale-compatible manner. Although nanoscale manifolding with minimum dimensions below one micrometer has been devel-

BRIEF DESCRIPTION OF THE DRAWINGS

The features and advantages of the disclosure will readily be appreciated by persons skilled in the art from the following detailed description when read in conjunction with the drawings, wherein:

FIGS. 5B-5E are flowcharts illustrating various embodiments of substeps in methods for fabrication of a fuel cell in accordance with the invention.

DETAILED DESCRIPTION OF EMBODIMENTS

Figure 1A:
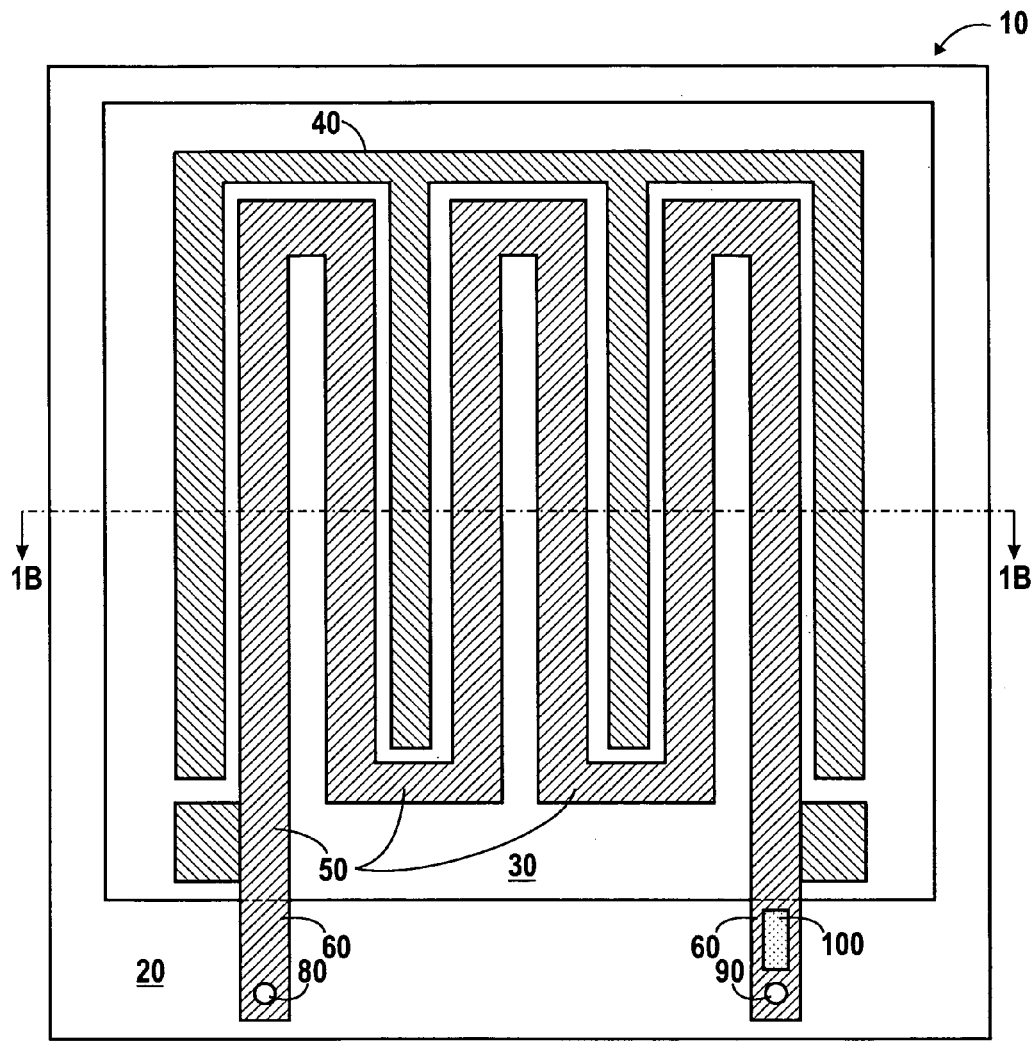
FIG. 1A is a top plan view of a unit cell of a fuel-cell embodiment made in accordance with the invention.

Throughout this specification and the appended claims, the term "fuel cell" means a fuel cell in its usual meaning or a battery cell having at least one each of an anode, a cathode, and an electrolyte. A "unit cell" is one cell comprising an anode, a cathode, and an electrolyte. The term "MEMS" has its conventional meaning of a micro-electro-mechanical system. The prefix "micro-" and the term "microscale" refer to structures having minimum dimensions of the order of about one micrometer. The verb "flowing" is used in a transitive sense, meaning causing a flow of a fluid. The term "lateral" is used to mean generally parallel to the principal plane of a generally planar unit cell. For clarity of the description, the drawings are not drawn to a uniform scale. In particular, vertical and horizontal scales may differ from each other and may vary from one drawing to another.

In accordance with one aspect of the invention, a MEMS-based fuel cell 10 has a substrate 20, an electrolyte 30 in contact with the substrate, a cathode 40 in contact with the electrolyte, an anode 50 spaced apart from the cathode and in contact with the electrolyte, and an integral manifold 60 for supplying either a fuel or an oxidant or both together. The integral manifold 60 extends over at least a portion of the electrolyte 30 and over at least one of the anode 50 and/or cathode 40. In some embodiments of such a fuel cell, electrolyte 30 is also the substrate 20, as will be made clear hereinbelow. Such a fuel cell may also be a unit cell in a fuel-cell assembly comprising a number of unit cells with suitable electrical connections. The unit cells may be stacked to form the fuel-cell assembly, for example, or may be arranged in a planar array.

Figure 1B:
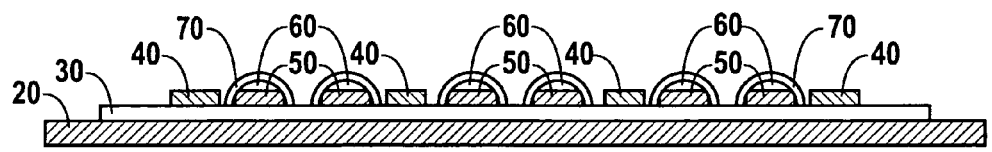
FIG. 1B is a front elevation cross-sectional view of the embodiment of FIG. 1A.

FIG. 1A is a top plan view of a unit cell of a fuel-cell embodiment 10 made in accordance with the invention. FIG. 1B is a front elevation cross-sectional view of the embodiment of FIG. 1A. While substrate 20 is shown as distinct in FIG. 1A, the electrolyte 30 may also serve as the substrate for other elements in some embodiments, obviating the need for a separate substrate. As shown in the embodiment of FIG. 1A, anode 50 and cathode 40 may be interdigitated. Chamber 70 includes manifold 60, which may be serpentine as shown in the drawing. In this embodiment, manifold 60 extends over the entire area of anode 50 and in this case carries the fuel to the anode 50. The exterior surface of integral manifold 60 may comprise electrolyte material.

Also shown in FIG. 1A are openings 80 and 90 which extend through substrate 20 and communicate with the interior of manifold 60. Fuel is provided to the anode by flowing fuel through opening 80 into manifold 60, and depleted fuel with anode-reaction products (such as water, for example) is exhausted from manifold 60 through opening 90.

Similarly, by reversing the designations of anode and cathode in FIGS. 1A and 1B, the same drawing may be made to illustrate a manifold 60 used to provide an oxidant such as oxygen in air to cathode 40 and/or to exhaust depleted oxidant (such as oxygen-depleted air) from the cathode region. Those skilled in the art will recognize that both cathode 40 and anode 50 can be simultaneously served by separate manifolds 60 (not shown).

Also shown in FIG. 1A is a catalytic element 100 provided within integral manifold 60, near the exhaust end of manifold 60, to provide a combustor. Catalytic element 100 comprises a deposited and patterned catalyst, such as platinum or palladium, suitable for catalytic combustion of the particular fuel used by the fuel cell, and thus provides a combustor within the integral manifold.

The fuel cell may include a conventional current collector, e.g., a patterned film of conductive material (not shown) and at least a portion of the current collector may be disposed on an exterior surface of the integral manifold 60 or adjacent to an exterior surface of the integral manifold 60. In some embodiments, the current collector may be disposed on the roof of manifold 60.

Thus, another aspect of the invention provides a manifold 60 for a fuel cell, the manifold itself having a substrate and an elongated roof affixed to the substrate. Generally, the roof may be semi-cylindrical or have a rectangular or trapezoidal cross-section, for example. The roof encloses an elongated interior volume communicating with the electrolyte and with at least one of the anode and cathode of the fuel cell. The interior volume generally may be semi-cylindrical, rectangular, or trapezoidal, for example. As described hereinabove, the manifold 60 may have an opening 80 or 90 extending through the substrate, whereby the interior volume of the manifold further communicates with the opening through the substrate.

Figure 3A:
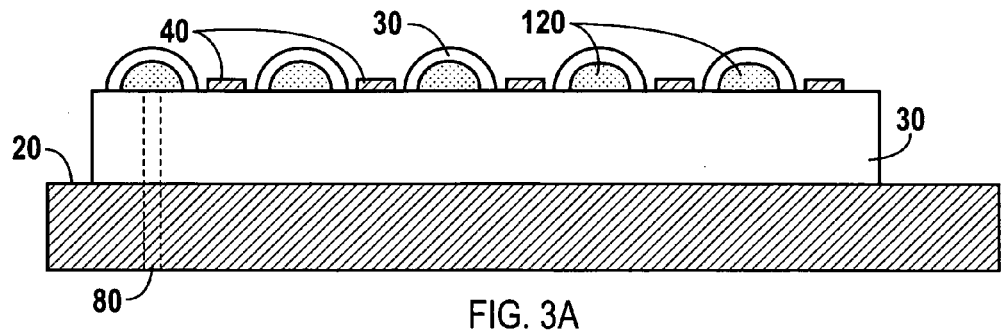
FIGS. 3A and 3B are side elevation cross-sectional views illustrating intermediate stages in fabrication of a second fuel-cell embodiment made in accordance with the invention.
Figure 3B:
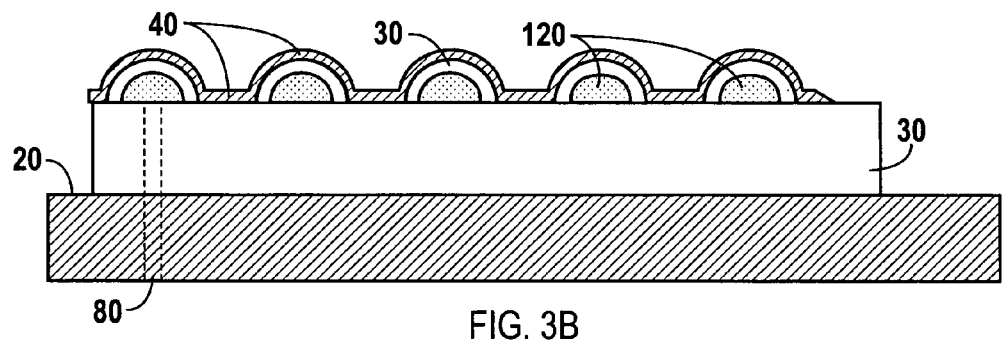

As shown in FIGS. 3A and 3B, the manifold 60 may include a porous substance 120 substantially filling the interior volume of the manifold, as described in more detail hereinbelow.

The various forms of manifold 60 provide integral means for supplying the fuel and/or the oxidant, and/or for exhausting depleted fuel and/or depleted oxidant. To do so, the various forms of manifold 60 extend over at least a portion of the electrolyte and over at least a portion of the anode and/or cathode. Those skilled in the art will recognize that fuel and oxidant inputs are conventionally provided from external sources and that exhausts of any depleted fuel and any depleted oxidant are conventionally directed to external outputs.

Fabrication

Figure 4A:
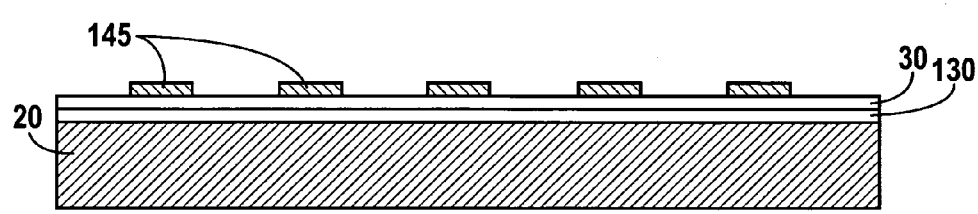
FIGS. 4A and 4B are side elevation cross-sectional views illustrating intermediate stages in fabrication of a third fuel-cell embodiment made in accordance with the invention.
Figure 4B:
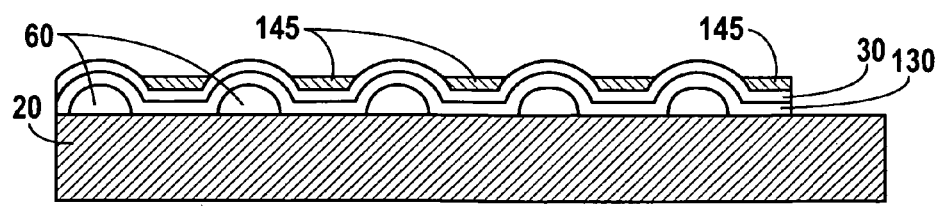
Figure 5A:
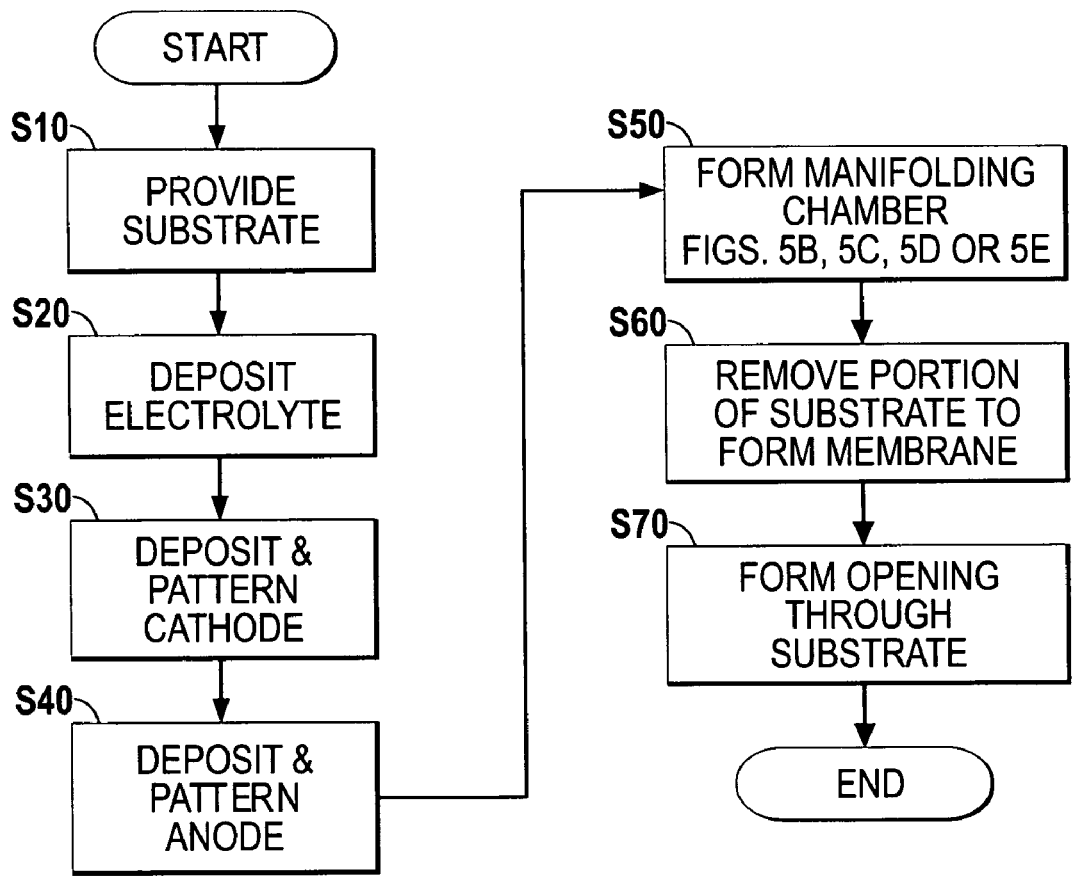
FIG. 5A is a flowchart illustrating an embodiment of an overall method for fabrication of a fuel cell in accordance with the invention.

In accordance with another aspect of the invention, a MEMS-based fuel cell 10 using a fuel and an oxidant may be fabricated by an overall method described below with reference to FIGS. 2A-2D and 5A. More specific methods are also described below with reference to FIGS. 3A-3B, 4A-4B, 5B-5D, 6 and 7. FIGS. 2A-2D are side elevation cross-sectional views illustrating various stages in fabrication of a first fuel-cell embodiment made in accordance with the invention. FIGS. 3A and 3B are side elevation cross-sectional views illustrating stages in fabrication of a second fuel-cell embodiment. FIGS. 4A and 4B are side elevation cross-sectional views illustrating stages in fabrication of a third fuel-cell embodiment. FIG. 5A is a flowchart illustrating an embodiment of an overall method for fabrication of a fuel-cell in accordance with the invention. FIGS. 5B-5E are flowcharts illustrating various embodiments of substeps in a method for fabrication of a fuel-cell in accordance with the invention. In the flowcharts, method steps are designated by reference numerals S10, . . . , S57.

The overall fabrication method, shown in FIG. 5A, generally includes steps of:

S10, providing a substrate 20;
S20, depositing an electrolyte 30 upon the substrate;
S30, depositing and patterning a cathode 40 in contact with the electrolyte;
S40, depositing and patterning an anode 50 spaced apart from cathode 40 and in contact with electrolyte 30;
S50, forming a chamber 70 extending over at least a portion of at least one of the cathode and anode; and
S70, forming an opening through the substrate to communicate with chamber 70.

Those skilled in the art will recognize that the order of cathode and anode depositions and subsequent sintering may be inverted, depending on processing temperature requirements, for example. The chamber 70 includes at least one integral manifold 60 for the fuel and/or oxidant. The chamber may extend over at least the entire anode, for example. Other steps are described hereinbelow in connection with more specific methods.

For some embodiments, a portion of the substrate the anode and cathode of the unit cell may be removed (step S60), e.g., by conventional wet etching or dry plasma etching, leaving a supporting membrane portion. Also, for some embodiments, the method includes a step of patterning the electrolyte. The electrolyte-depositing step may comprise depositing a solid-oxide electrolyte or a proton-exchange-membrane (PEM) electrolyte, for example.

Figure 2A:
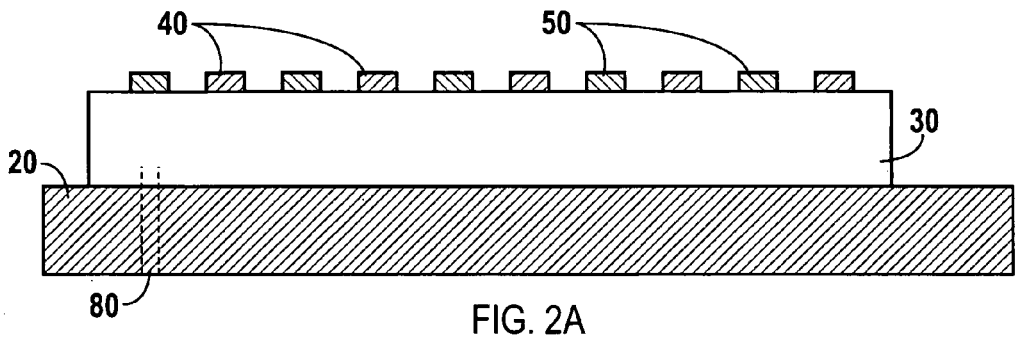
FIGS. 2A-2D are side elevation cross-sectional views illustrating intermediate stages in fabrication of a first fuel-cell embodiment made in accordance with the invention.
Figure 2B:
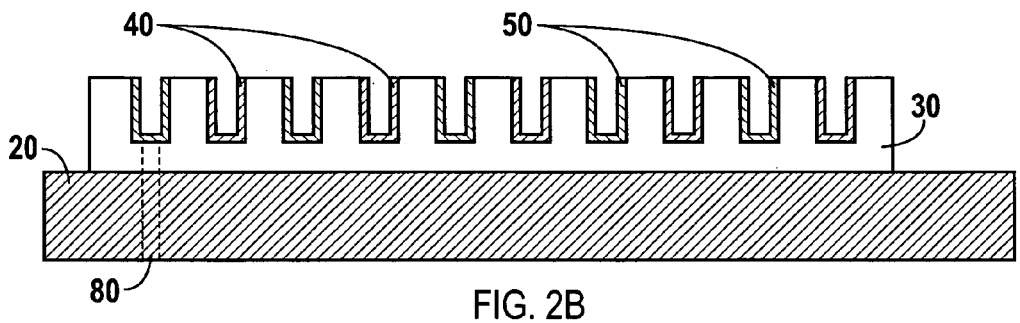
Figure 2C:
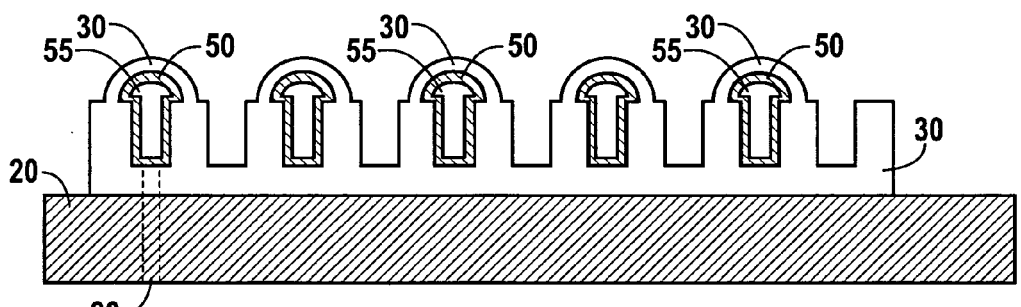
Figure 2D:
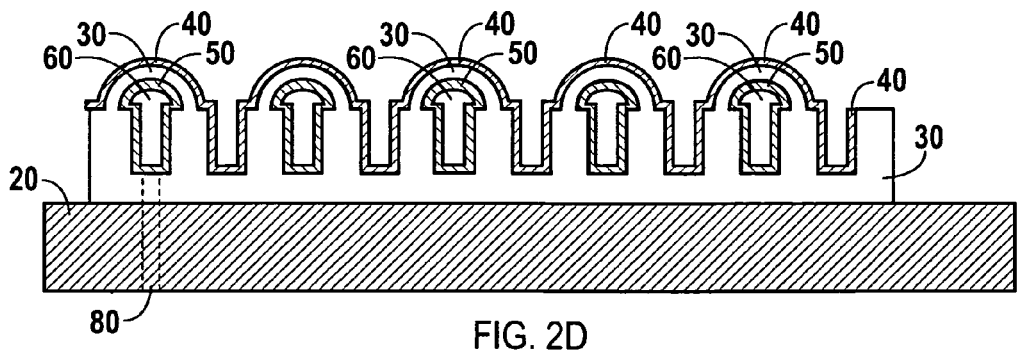

Various methods for forming chamber 70 are illustrated in FIGS. 5B-5E. As shown in FIG. 5B, one method for forming the chamber uses substeps of:

S51, depositing a layer of sacrificial material and patterning the sacrificial material 55;
S52, covering the sacrificial material with a suitable material to form a chamber roof (FIG. 2C); and
S53, removing sacrificial material 55 (FIG. 2D).

Sacrificial material 55 may be silicon (polycrystalline or amorphous), oxides of silicon, spin-on-glass (SOG) compounds, photoresists, pyrolyzable polymers, and other release films conventionally used in the field of MEMS fabrication. A selection criterion for these sacrificial films is their etch selectivity in comparison with the other fuel-cell materials used in the structure. A suitable sacrificial polymer material is a polynorbornene, such as Unity™ Sacrificial Polymer, which may be cleanly removed by pyrolysis at 350-425 C. This material is commercially available from Promerus Electronic Materials of Brecksville, Ohio. Alternative polymers for some applications are polymethylmethacrylate (PMMA), polystyrene, or polyparaxylene (Parylene™) and derivatives of the latter polymer, for example.

Some suitable materials to form the chamber roof for various embodiments are silicon oxide, silicon nitride, silicon oxynitride, silicon carbide, aluminum oxide, spin-on-glass (SOG) compounds, polyimides (e.g., for low temperature cells), other photopolymer systems, and the actual fuel cell electrolyte material itself. A suitable photopolymer for some embodiments is a negative, epoxy-type, near-UV photoresist based on EPON™ (e.g., SU-8, available from MicroChem Inc. of Newton, Mass.). Thus, a suitable material to form the chamber roof may be an electrolyte or a non-electrolyte.

As described hereinabove, manifold 60 may include a porous substance 120 substantially filling the interior volume of the manifold. Porous substance 120 may serve as an electrode. The method for forming chamber 70 illustrated in FIG. 5C simply comprises substep S54, forming a porous electrode 120 (FIG. 3A), and substep S55, covering the porous electrode with a suitable material to form a chamber roof (FIG. 3B). The material used to form the chamber roof may be an electrolyte 30 or a non-electrolyte.

Another method for forming chamber 70 is illustrated in FIG. 5D. This method comprises the substeps of:

S56, depositing and patterning a planar film of an oxidizable material 130 (FIG. 4A); and S57, oxidizing the oxidizable material 130 to form a chamber roof as the material expands, leaving an opening to serve as manifold 60 (FIG. 4B).

As shown in FIGS. 4A and 4B, a layer of electrolyte 30 may be deposited over the oxidizable material 130. In some embodiments, material 130 may be a material suitable for use as the cathode 40. As shown in FIGS. 4A and 4B, an inert material, such as silicon oxide or aluminum oxide, for example, may be deposited and patterned to form an "anchoring" portion 145 to hold a peripheral portion of the oxidizable material in contact with the electrolyte. In contrast to the portions of material under anchoring portions 145, the adjacent portions of material swell when they oxidize. When the portions adjacent to anchoring portions 145 oxidize, the swelling of the oxidizable material forms the openings for manifold 60. In some embodiments, the step of depositing an electrolyte 30 may be performed after forming the manifold 60 of chamber 70.

Manifold 60 of chamber 70 may be formed by tape-casting the electrolyte 30. A method for forming manifold 60 of chamber 70 is illustrated by FIG. 5E and by FIGS. 6 and 7. An unfired ("green") tape 35 of electrolyte material carrying the cathode 40 and anode 50 is provided (step S81). A mold (parts 200 and 210) is provided (step S82) for forming a desired shape for the chamber. The upper part 200 of the mold has cavities 220 shaped for the roof of the chamber. The lower part 210 of the mold has bosses 230 shaped for the inner wall of the chamber. Both sides of the unfired tape 35 of electrolyte material carrying the cathode and anode are coated with a suitable solvent (step S83) if necessary, e.g., an alcohol such as isopropyl alcohol (IPA), or solvent mixture. Other solvents suitable for particular green tapes include (but of course are not limited to) ethanol and methyl ethyl ketone, for example. The solvent or solvent mixture should be suitable for use with the particular composition of the green tape and its binder. The unfired tape 35 of electrolyte material carrying the cathode and anode is pressed (step S84, indicated by arrows 240) to form the desired chamber shape. The shaped elements are assembled by pressing with substrate 20 (FIG. 7). The assembled and shaped elements are co-fired (step S85) to form the chamber.

In preparing the unfired tape 35 of electrolyte material carrying the cathode and anode, a cathode material may be deposited and optionally patterned on at least one side of an unfired tape of electrolyte material. Deposition of the cathode material may be done by printing, e.g., by silk-screen-printing. Alternative printing techniques include, but are not limited to transfer printing, spraying through a stencil mask, extrusion printing, extrusion printing with subsequent embossing, and other suitable printing techniques that may occur to those skilled in the art.

Figure 6:
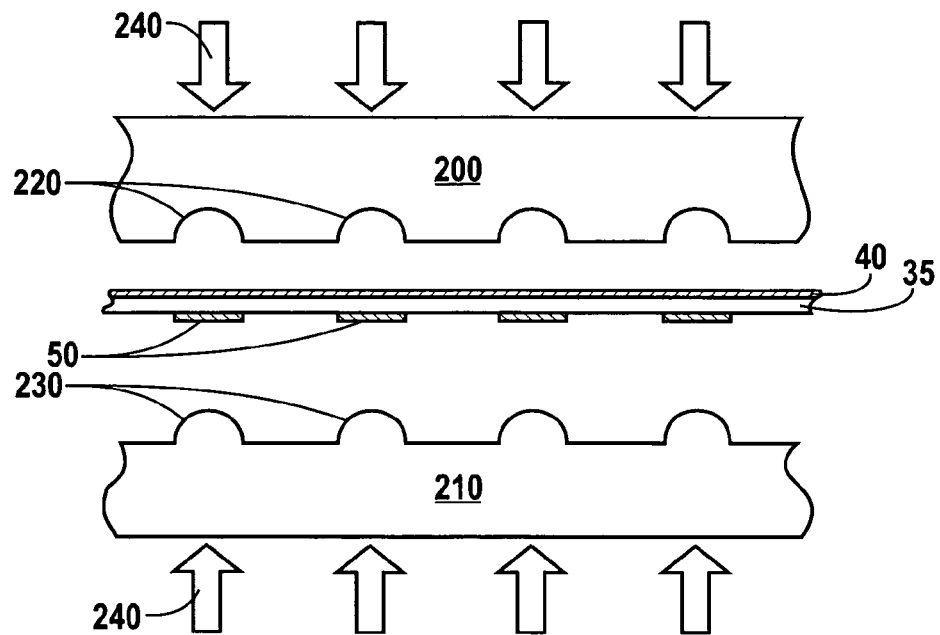
FIG. 6 is a side elevation cross-sectional view illustrating a method for forming a portion of a fuel cell in accordance with the invention.
Figure 7:
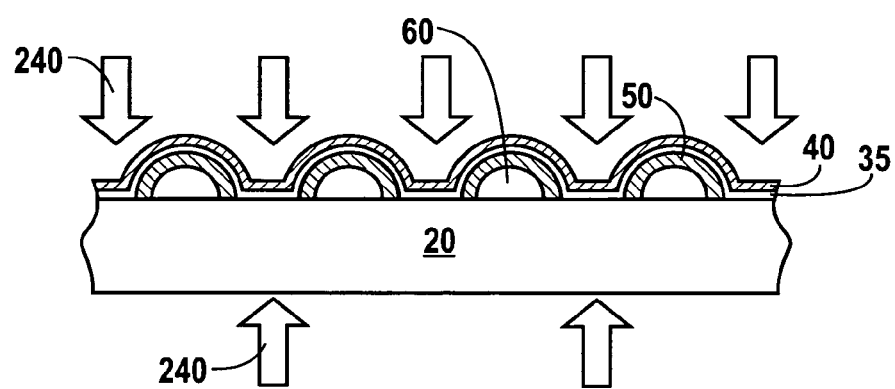
FIG. 7 is a side elevation cross-sectional view illustrating a method for assembling a portion of a fuel cell in accordance with the invention.

In the embodiment of FIG. 6, it is deposited on the top surface of the tape and not patterned. Similarly, an anode material may be deposited and patterned on at least one side of the unfired tape of electrolyte material. In the embodiment of FIG. 6, it is deposited on the bottom surface of the tape and patterned to form the interior surface of the roof of manifold 60. Again, as for the cathode, deposition and patterning of the anode material may be done by silk-screen printing, for example. In embodiments wherein both cathode 40 and anode 50 are deposited and patterned on the same side of the unfired tape 35 of electrolyte material, both may be deposited and patterned by silk-screen-printing or other suitable printing techniques.

One or more openings 80 and/or 90 communicating with chamber 70 may be formed through the substrate under the chamber. Openings 80 and/or 90 may be adapted for flow of the fuel and/or oxidant into the chamber or for exhaust flow of depleted fuel and/or depleted oxidant out of the chamber. Similarly, a third opening (not shown) may be formed through the substrate under the chamber, communicating with the chamber and adapted for exhaust flow of depleted fuel and/or depleted oxidant out of the chamber.

By combining various elements of fabrication methods performed in accordance with the invention, a method may be practiced comprising the steps of providing a substrate, depositing (and optionally patterning) an electrolyte upon the substrate, depositing and patterning a cathode in contact with the electrolyte, depositing and patterning an anode spaced apart from the cathode and in contact with the electrolyte, forming a first chamber extending over at least the anode (the first chamber including an integral manifold for the fuel), forming a second chamber extending over at least the cathode (this chamber including an integral manifold for the oxidant), removing at least a portion of the substrate under the anode and cathode (leaving a membrane portion), forming a first opening through the substrate under the first chamber (this opening communicating with the first chamber and being adapted for flow of fuel into the first chamber), and forming a second opening through the substrate under the second chamber (communicating with the second chamber and being adapted for flow of oxidant into that chamber). The membrane portion may be supported around its entire periphery, or at least part of the membrane portion may be removed so as to leave the membrane portion cantilevered.

According to another aspect of the invention, a method is provided for using a manifold in a MEMS-based fuel cell of the type using a fuel and an oxidant. In this method a substrate carrying an electrolyte, a cathode in contact with the electrolyte, and an anode spaced apart from the cathode and in contact with the electrolyte are provided. An integral manifold for at least one of the fuel and oxidant is also provided, the integral manifold extending over at least a portion of the electrolyte and over at least a portion of one of the anode and cathode. At least one of the fuel and oxidant is supplied through the integral manifold to the electrolyte and to at least one of the anode and cathode. An opening extending through the substrate and communicating with the integral manifold may be used for flowing at least one of the fuel and oxidant through the opening and into the integral manifold. Similarly, an opening extending through the substrate and communicating with the integral manifold may be used for flowing at least one of the depleted fuel and oxidant out of the integral manifold and through the opening. A catalytic combustor may be provided within the integral manifold.

INDUSTRIAL APPLICABILITY

Fuel-cell structures made in accordance with the present invention and specially-adapted methods performed in accordance with the invention are useful in manufacture of compact portable fuel cells.

Although the foregoing has been a description and illustration of specific embodiments of the invention, various modifications and changes thereto can be made by persons skilled in the art without departing from the scope and spirit of the invention as defined by the following claims. For example, the order of performing various steps may be varied and various functionally equivalent materials may be substituted for those used in the embodiments described herein.

What is claimed is:

1. A fuel cell that uses a fuel and an oxidant, the fuel cell comprising a micro-electro-mechanical system that includes:
   a substrate;
   an electrolyte on the substrate;
   a cathode on the electrolyte;
   an anode on the electrolyte and laterally spaced apart from the cathode;
   at least one chamber extending over only one of the cathode and the anode, the at least one chamber including an integral manifold for at least one of the fuel and the oxidant; and
   an opening extending through the substrate under the chamber, the opening communicating with the chamber, whereby the opening is configured for flow of at least one of the fuel and the oxidant into the chamber, and wherein the substrate thins under the anode and the cathode, leaving a membrane portion of the substrate supporting the anode and the cathode.

2. The fuel cell of claim 1, wherein the exterior surface of the integral manifold comprises electrolyte material.

3. The fuel cell of claim 1, further comprising a current collector, the current collector comprising a patterned film of conductive material.

4. The fuel cell of claim 3, wherein at least a portion of the current collector is disposed on an exterior surface of the integral manifold.

5. The fuel cell of claim 3, wherein at least a portion of the current collector is disposed adjacent to an exterior surface of the integral manifold.

6. The fuel cell of claim 1, further comprising a combustor for combustion of depleted fuel.

7. The fuel cell of claim 6, wherein the combustor comprises a patterned film of a catalyst for combustion of the fuel, the patterned film of the catalyst being disposed within the at least one chamber.

8. The fuel cell of claim 7, wherein the patterned film of the catalyst is disposed within the integral manifold.

9. The fuel cell of claim 1, wherein the manifold comprises an elongated roof affixed to the substrate and enclosing a generally semi-cylindrical interior volume communicating with the electrolyte and with at least one of the anode and the cathode of the fuel cell.

10. The fuel cell of claim 9, further comprising an opening extending through the substrate, and wherein the interior volume of the manifold further communicates with the opening through the substrate.

11. The fuel cell of claim 9, further comprising a porous substance substantially filling the interior volume of the manifold.

12. The fuel cell of claim 9, further comprising a catalyst disposed within the manifold.

13. The fuel cell of claim 12, wherein the catalyst is a combustion catalyst.

14. The fuel cell of claim 9, further comprising a current collector disposed on the roof of the manifold.

15. A fuel cell that uses a fuel and an oxidant, the fuel cell comprising a micro-electro-mechanical system that includes:
   an electrolyte on a substrate;
   a cathode on the electrolyte;
   an anode on the electrolyte and laterally spaced apart from the cathode; and
   an integral manifold for supplying one of the fuel and the oxidant to one of the cathode and the anode; and
   a combustor within the integral manifold, the combustor comprising a patterned film of catalyst for combustion of the fuel, and wherein the integral manifold extends over only one of the cathode and the anode, and further wherein the substrate thins under the anode and the cathode, leaving a membrane portion of the substrate supporting the anode and the cathode.

16. A fuel cell that uses a fuel and an oxidant, the fuel cell comprising a micro-electro-mechanical system that includes;
   a substrate;
   an electrolyte on the substrate;
   a cathode on the electrolyte;
   an anode on the electrolyte and laterally spaced apart from the cathode; and
   integral means for supplying at least one of the fuel and oxidant, the supplying means extending over at least a portion of the electrolyte and over only one of the anode and the cathode, and wherein the substrate thins under the anode and the cathode, leaving a membrane portion of the substrate supporting the anode and the cathode.

17. The fuel cell of claim 16, further comprising:
   means for flowing at least one of the fuel and the oxidant through the substrate and communicating with the integral means for supplying at least one of the fuel and the oxidant.

18. The fuel cell of claim 16, further comprising:
   integral means for exhausting at least one of depleted fuel and depleted oxidant.

19. The fuel cell of claim 18, further comprising:
   means for flowing at least one of the depleted fuel and the depleted oxidant through the substrate, communicating with the integral means for exhausting at least one of the depleted fuel and the depleted oxidant.

20. The fuel cell of claim 18, further comprising:
   integral means for combustion of the depleted fuel, the means for combustion being disposed within the integral means for exhausting.

* * * * *